2,975,076
PREPARING GLASS COATING COMPOSITIONS

Arnold E. Saunders, Saxonburg, and William E. Wagner, Verona, Pa., assignors to Pittsburgh Plate Glass Company, Allegheny County, Pa., a corporation of Pennsylvania No Drawing. Filed Nov. 12, 1957, Ser. No. 695,527

20 Claims. (Cl. 117—124)

This application relates to improvements in preparing glass coating compositions and specifically concerns the treatment of cobalt acetate compositions prior to their application on heated glass sheets to produce heat screening coatings whose composition contains cobalt oxide as an essential ingredient.

United States Patent 2,688,565 to Richard F. Raymond discloses a method of producing a cobalt oxide film on a glass sheet by applying cobalt acetate, dissolved in water or an alcohol or dispersed in water soluble waxes, on the glass sheet heated to an elevated temperature between 400° F. and the point at which the glass sheet becomes molten.

Such films have been found to be especially useful in the production of enlarged, coated, curved vehicle window closures, since the coating can be kept to a thickness less than that which produces iridescence while reducing the luminous transmittance to as low as 22 percent and total energy transmittance to 15 percent when such coatings are applied to glass sheets of ¼ inch thickness having a soda-lime-silica composition containing between .25 and 1 percent by weight of iron oxide.

When commercial production of automobile backlights containing cobalt oxide coatings was started using the coating techniques taught by Raymond, articles produced were satisfactory for their low transmission properties but were characterized by grainy coatings having an irregular texture. For some time, the non-uniform spots in the coatings caused a not inconsiderable proportion of rejects when these articles were produced commercially. The present invention has developed coating techniques substantially eliminating graininess and spottiness from commercially produced coatings of cobalt oxide.

Specifically, improved coatings have been produced consistently on a commercial basis by reacting cobalt acetate with an aliphatic monohydric alcohol in which cobalt acetate is soluble, at a temperature between 100° F. and the boiling point of the alcohol for a time sufficient to produce a fine pink precipitate, the average particle size of which does not exceed 5 microns. The heating is dicontinued before the composition begins to agglomerate. The composition so produced is drained through a 200 mesh screen to remove particles in excess of 200 mesh.

The composition so produced is preferably sprayed onto a heated glass surface to produce a cobalt oxide film within approximately two weeks of the prior heat treatment. Further delay in spraying the composition may cause the coated glass surface to develop characteristics inherent in some prior art techniques. This has been attributed to the regrowth of crystals to a size in excess of 5 microns.

Including small amounts of other acetates such as nickel acetate or iron acetate with cobalt acetate improved the durability of the films formed. In adding nickel acetate, for example, the amount of nickel acetate added is preferably on the order of 10 percent by weight of cobalt acetate in the composition.

Addition of minor amounts of acetic acid improves the film formation rate without any noticeable change in the character of the film. However, when glacial acetic acid in excess of 8 percent by weight of the composition to which it is added is utilized, the spray volatilizes excessively, resulting in non-uniform film formation resulting in a film having a non-uniform transmission pattern, especially when the glass is heated to the lower temperatures of the range of film forming temperatures recited above. For practical purposes, a concentration of glacial acetic acid in the amount of 6 grams per 100 grams of mixture containing cobalt acetate and aliphatic monohydric alcohol is preferred.

The treatment described in the present application provides drastically improved results over those obtained by spraying identical compositions not subject to the heat treatment when the vehicle employed is taken from aliphatic monohydric alcohols containing between 1 and 5 carbon atoms and their mixtures. Thus, compositions containing methyl alcohol, ethyl alcohol, propyl alcohol, butyl alcohol, isopropyl alcohol, isobutyl alcohol, amyl alcohol and mixtures of two or more of the alcohols produced markedly improved film uniformity when the heating technique described above was performed. The same compositions when applied directly to heated glass surfaces without the heat treatment described above produced films not substantially different in quality of uniformity from those produced by applying aqueous solutions.

A common feature of these monohydric aliphatic alcohols is their ability to dissolve cobalt acetate to the extent of at least 100 grams per kilogram of vehicle. Furthermore, all of these alcohols are liquid at room temperature and 100° F.

Compositions containing cobalt acetate and the lower aliphatic monohydric alcohols, when heated as described above, produce a pinkish precipitate of crystalline structure whose mean diameter is not in excess of 5 microns, and preferably between 0.1 and 0.5 microns. If the heating continues for too long a period, such as more than about 5 minutes at the boiling point of the alcohol (147° F. for methanol and 173° F. for ethanol) and longer periods at lower temperatures, on the order of several hours at temperatures on the order of 100° F., the precipitate agglomerates and forms a gel which cannot be dispensed through a spray gun because of clogging.

The following experiments were performed to demonstrate the effectiveness of the heating technique as disclosed above.

Example I

Glass sheets ¼ inch thick, 6 inches wide and 12 inches long and having a composition consisting essentially of the following parts by weight:

| | Percent |
|---|---|
| $SiO_2$ | 71 to 72 |
| $Na_2O$ (including about 0.5% $K_2O$ impurities) | 13.0 to 13.2 |
| CaO | 11.6 to 11.8 |
| MgO | 2.3 to 2.5 |
| $Na_2SO_4$ | 0.4 to 0.5 |
| NaCl | 0.1 |
| $Al_2O_3$ | 0.2 |
| $Fe_2O_3$ | 0.5 to 0.6 |

Impurities (mostly $TiO_2$ and $Zr_2O_3$)—0.01 to 0.04% were heated individually for approximately four minutes in a furnace set at a temperature of 1250° F.

The heated sheets were removed from the furnace and passed across the path of a spray dispensed from a spray gun located 10 inches away from the path of movement of the heated glass sheets. The rate of movement of the individual sheets was adjusted so that the desired commercial visible transmission of 25 percent was obtained for each of the samples reported. Binks spray gun model No. 19 utilizing 55 p.s.i. pressure of atomizing air was used for the spray gun.

In Table I, the composition used in each instance contained 30 grams of $(CH_3COO)_2$ Co. $4H_2O$ and 3 grams of $(CH_3COO)_2$ Ni. $4H_2O$ in 100 grams of the vehicle. Wherever an asterisk appears in the following tables in the column headed "Vehicle," 6 grams of glacial acetic acid was added to 100 grams of the composition. The table also records the amount of solution sprayed and the time of spray needed to obtain the film thickness providing a visible transmission of 25 percent.

The film appearance was graded as follows:

Grade D was assigned to the poorest films so grainy as to be commercially unacceptable, Grade C was assigned to those films that were barely acceptable for commercial purposes, Grade B films were superior to Grade C films and Grade A films were the best with respect to absence of graininess from the coating.

TABLE I

| Sample | Vehicle | Solution Heat Treatment | Volume Sprayed (cc.) | Time (sec.) | Appearance Grading |
|---|---|---|---|---|---|
| IA | water | none | 12 | 11 | D |
| IB | do* | do | 8 | 7 | D |
| IC | do* | heat to boil 5 min.—no ppt. formed. | 8 | 8 | D |
| ID | methanol | none | 14 | 9 | C |
| IE | do* | do | 9 | 6 | C+ |
| IF | do* | heat to boil 5 min.—pink ppt. formed. | 6 | 4 | B |
| IG | ethanol | slight heat necessary to dissolve 30 g. of cobalt acetate—no ppt. formed. | 18 | 10 | C |
| IH | do* | heat to boil 5 min.—pink ppt. formed. | 10 | 6 | A |
| II | do* | slow heat 120° F.—4 hours—pink ppt. formed. | 10 | 5 | A |
| IJ | 50 g. methanol, 50 g. ethanol. | heated to boil 5 min.—pink ppt. formed. | 8 | 6 | B |
| IK | IJ* | do | 6 | 5 | B |
| IL | 50 g. ethanol, 50 g. isopropanol. | do | 9 | 6 | B |
| IM | IL* | do | 8 | 5 | B |
| IN | 25 g. methanol, 50 g. ethanol, 25 g. n-propanol. | do | 9 | 6 | B |
| IO | IN* | do | 9 | 6 | B |

*Example II*

Experiments were performed with other samples of the same glass composition 4 inches by 6 inches by ¼ inch using the higher monohydric aliphatic alcohols. Since cobalt acetate is less soluble in these heavier alcohols, only 15 grams of cobalt acetate and 1.5 grams of nickel acetate were added to 100 grams of vehicle. The sheets were sprayed with a hand gun from approximately 10 inches away from the sheets to produce a film having the desired commercial property of 25 percent visible transmission. The results are tabulated in Table II.

TABLE II

| Sample | Vehicle | Solution Heat Treatment | Volume Sprayed (cc.) | Time (sec.) | Appearance Grading |
|---|---|---|---|---|---|
| IIA | n-propanol | heat to boil 5 min.—pink ppt. | 8 | 8 | A |
| IIB | do* | do | 7 | 7 | A |
| IIC | isopropanol | do | 13 | 13 | C+ |
| IID | do* | do | 11 | 10 | C+ |
| IIE | n-butanol | do | 11 | 11 | C |
| IIF | do* | do | 9 | 9 | C |
| IIG | n-amyl alcohol. | do | 10 | 10 | C |
| IIH | do* | do | 9 | 8 | C− |
| III | n-heptyl alcohol. | heat to boil 5 min.—slight amount of pink ppt. | 20 | 20 | D− |
| IIJ | do* | do | 20 | 20 | D− |
| IIK | n-octyl alcohol | Cobalt acetate is not soluble | | | |

*Example III*

An attempt was made to dissolve 30 grams of cobalt acetate and 3 grams of nickel acetate in 100 grams of various organic vehicles other than alcohols. Samples of glass of a size and composition similar to those used in Example II above were treated as described above by compositions listed in Table III below.

TABLE III

| Sample | Vehicle | Solution Heat Treatment | Volume Sprayed (cc.) | Time (sec.) | Appearance Grading |
|---|---|---|---|---|---|
| IIIA | diethylene glycol. | heat to boil 5 min.—pink ppt. formed. | no film formation | | |
| IIIB | do.* | do | no film formation | | |
| IIIC | ethoxy ethanol. | do | 11 | 10 | D− |
| IIID | do.* | heat to boil 5 min.—purple ppt. formed. | 10 | 10 | D− |
| IIIE | diethylene glycol monoethyl ether. | do | 20 | 20 | D |
| IIIF | do.* | do | 20 | 20 | D |
| IIIG | glycerol | heat to boil 5 min.—pink ppt. formed. | no film formation | | |
| IIIH | do.* | do | no film formation | | |
| IIII | glacial acetic acid. | heat to boil 5 min.—slight pink ppt. formed. | very poor film | | D− |

Other solvents which were tried but failed to dissolve the cobalt acetate were: n-hexane, benzene, toluene, xylene, carbon tetrachloride, methyl chloroform, perchloroethylene, acetone, methyl isobutyl ketone, cyclohexanone, butyl acetate, amyl acetate, triethyl phosphate.

*Example IV*

The effect of the addition of different concentrations of glacial acetic acid to 100 grams to a solution of 30 grams of hydrated cobalt acetate, 3 grams of hydrated nickel acetate and 100 grams of ethanol were studied. The various compositions were heated to boiling and then boiled about five minutes to produce a fine pink precipitate as described in the previous examples. Plates similar to those used in Examples II and III were heated as before and hand sprayed for a time and using an amount of solution as indicated in Table IV below. Again, the films were graded as to lack of graininess. In each case, the spraying was conducted for a period of time sufficient to produce an article having 25 percent light transmission as in the earlier examples.

TABLE IV

| Sample | Acid added g. | Amount of Solution used (cc.) | Time, Seconds | Film Grade |
|---|---|---|---|---|
| IVA | 0 | 12 | 9 | B |
| IVB | 1 | 11 | 8 | B |
| IVC | 2 | 10 | 7 | A |
| IVD | 3 | 10 | 7 | A |
| IVE | 4 | 10 | 7 | A |
| IVF | 5 | 9 | 5-6 | A |
| IVG | 6 | 9 | 5 | A |
| IVH | 8 | 8 | 5 | A |
| IVI | 10 | 8 | 5 | [1] note |

[1] Note.—Coatings were commercially defective because of a sharp pattern of variation in film transmission.

The above examples have been described for the purpose of illustrating rather than limiting the present invention. Reference to the latter may be had by studying the accompanying claims.

What is claimed is:

1. In the preparation of a cobalt oxide film from a medium consisting essentially of cobalt acetate and an aliphatic monohydric alcohol containing from 1 to 5 carbon atoms and capable of dissolving cobalt acetate to the extent of at least 200 grams per liter at 20° C., and having 0 to 8 parts by weight of glacial acetic acid per 100 parts of medium and 0 to 10 parts by weight of an acetate taken from the group consisting of iron acetate and nickel acetate per 100 parts of cobalt acetate, the improvement comprising heating the composition to a temperature between 100° F. and the boiling point of the alcohol for a time sufficient to produce particles of a fine pink precipitate having an average particle size not exceeding 5 microns, draining the composition through a screen to remove particles in excess of 200 mesh, and dispensing the drained composition toward a glass sheet heated to within a few hundred degrees of the softening point of the glass before the precipitate particles grow to an average size in excess of 5 microns.

2. The improvement according to claim 1, wherein the medium includes nickel acetate in an amount on the order of 10 percent by weight of cobalt acetate.

3. The improvement according to claim 1, wherein the medium includes up to 8 percent by weight of glacial acetic acid.

4. The improvement according to claim 1, wherein the alcohol is methanol.

5. The improvement according to claim 1, wherein the alcohol is ethanol.

6. The improvement according to claim 1, wherein the medium is boiled for a period not exceeding 5 minutes.

7. The improvement according to claim 1, wherein the medium includes nickel acetate on the order of 10 percent by weight of cobalt acetate and about 6 percent by weight of glacial acetic acid.

8. A composition of matter comprising a reaction product formed from heating a medium consisting essentially of a monohydric aliphatic alcohol containing between 1 and 5 carbon atoms and cobalt acetate, and having up to 8 parts by weight of glacial acetic acid per 100 parts of medium and 0 to 10 parts by weight of an acetate taken from the group consisting of iron acetate and nickel acetate per 100 parts of cobalt acetate at a temperature between 100° F. and the boiling point of the alcohol for a time sufficient to produce a fine pink precipitate.

9. A composition of matter as in claim 8, wherein the alcohol is methanol.

10. A composition of matter as in claim 8, wherein the alcohol is ethanol.

11. A composition of matter suitable for use to form a film on heated glass surfaces consisting substantially of a slurry containing particles having an average size not in excess of 5 microns, said particles consisting essentially of a product formed by heating cobalt acetate and a monohydric aliphatic alcohol containing between 1 and 5 carbon atoms in a medium including 0 to 8 parts by weight of glacial acetic acid per 100 parts of medium and 0 to 10 parts by weight of an acetate taken from the group consisting of iron acetate and nickel acetate per 100 parts of cobalt acetate at a temperature between 100° F. and the boiling point of the alcohol for a time sufficient to produce a fine pink precipitate.

12. The composition according to claim 11, wherein the average size of the particle does not exceed 0.5 micron.

13. A composition as in claim 11, wherein the alcohol is methanol.

14. A composition as in claim 11, wherein the alcohol is ethanol.

15. A composition of matter suitable for use to produce a film on glass, said composition consisting essentially of the product resulting from heating the following ingredients: cobalt acetate and an aliphatic monohydric alcohol containing between 1 and 5 carbon atoms, and having up to 8 parts by weight of glacial acetic acid per 100 parts of composition and 0 to 10 parts by weight of an acetate taken from the group consisting of iron acetate and nickel acetate per 100 parts of cobalt acetate, wherein said ingredients are heated at a temperature between 100° F. and the boiling point of the alcohol for a time sufficient to produce a fine pink precipitate.

16. A composition according to claim 15, including nickel acetate in an amount on the order of 10 percent by weight of cobalt acetate.

17. A composition according to claim 15, including about 6 percent by weight of glacial acetic acid.

18. A composition according to claim 15, including nickel acetate on the order of 10 percent by weight of cobalt acetate and about 6 percent by weight of glacial acetic acid.

19. An article of manufacture comprising a transparent glass sheet and a heat screening cobalt oxide containing coating substantially free of graininess and spottiness superimposed on a surface of said sheet, said coating being substantially identical to that prepared according to claim 1.

20. An article of manufacture comprising a transparent glass sheet and a heat screening metal oxide coating substantially free of graininess and spottiness superimposed on a surface of said sheet, said coating containing cobalt oxide and an additional metal oxide from the class consisting of nickel oxide and iron oxide and being substantially identical to one prepared by heating said glass sheet to within a few hundred degrees of its softening point and dispensing a composition according to claim 15 onto said surface of said heated sheet.

References Cited in the file of this patent

UNITED STATES PATENTS

| | | |
|---|---|---|
| 2,617,741 | Lythe | Nov. 11, 1952 |
| 2,617,742 | Olson | Nov. 11, 1952 |
| 2,688,565 | Raymond | Sept. 7, 1954 |

FOREIGN PATENTS

| | | |
|---|---|---|
| 466,517 | Germany | Oct. 8, 1928 |

OTHER REFERENCES

Copaux: "Ann des chim" (8), 6, 555 6 and 9.

Davidson et al.: "Jour. Am. Chem. Soc.," 55, 3531-7 (1933).

Jander et al.: "Zeit Anorg. Chem.," 255, 238-52 (248) (1948).

Schall et al.: "Zeit. Elek. Chem.," 35, 337-344.